UNITED STATES PATENT OFFICE.

GEORGE S. WOLFF, OF PHILADELPHIA, PENNSYLVANIA.

PRODUCT FROM LAC.

SPECIFICATION forming part of Letters Patent No. 345,203, dated July 6, 1886.

Application filed March 30, 1885. Renewed December 7, 1885. Serial No. 184,990. (No specimens.)

*To all whom it may concern:*

Be it known that I, GEORGE S. WOLFF, a citizen of the United States, and a resident of Philadelphia, Pennsylvania, have invented a new Product Obtained from Lac and the Process of Producing the Same, of which the following is a specification.

The new product, which forms the main subject of this application for a patent, consists of lac (either shellac, seed-lac, or stick-lac) treated substantially in the manner hereinafter described, whereby it is converted into a non-resinous substance, infusible and readily soluble in water, and when so dissolved of an adhesive nature.

In about three pounds of sulphuric acid, which may be the oil of vitriol of commerce, I place about one pound of lac, and stir the mixture at intervals of for from ten to fourteen days, or until there is a homogeneous liquid mass free from lumps.

It is not essential in conducting this part of the process that the precise proportions of ingredients given above should be adhered to, or that the stirring at intervals should be continued for any specific period of time; but I have found in practice and in treating ordinary shellac that good results may be obtained by following the foregoing rules. Too long exposure of the lac to the action of the sulphuric acid and consequent carbonization of the former are of course to be avoided. If the proportion of acid be increased, the process will be hastened, but the expense will be increased, and if the proportion of acid be decreased the process will be retarded. The character of the lac may play a part in deciding the best proportions. For instance, the lac known in the trade as "Campbell's D. C.," which consists of very thin flakes, is acted on more promptly by the acid than the lac consisting of lumps of considerable size, such as the "Garnet lac" and "Button lac" of commerce.

In the above-described solution of lac in sulphuric acid I pour about fifteen pounds of clear water, stirring the mixture while the water is being poured in. The result of this treatment is a heavy precipitate and a quantity of free acid. The precipitate I then dissolve in eight fluid pounds of clear water, and into this solution stir a saturated solution of salt, consisting of about one pound of salt in six fluid pounds of water. I thus obtain again a precipitate, which may again be dissolved in clear water, this alternate precipitation by means of salt-water and solution of the precipitate in clear water being continued until a precipitate is obtained practically free from traces of acid.

It is not essential that the relative proportions of lac solution, clear water, and salt solution given above should be strictly adhered to in carrying out this portion of the process. I give them as the proportions which I have found suitable in practice; but they may be departed from to some extent without material variance in result. In any case, however, care should be taken that the quantity of water poured upon the original solution of lac in sulphuric acid is great enough to prevent the evolution, in making the mixture, of a high degree of heat, which would injuriously affect the character of the precipitate. I have found in practice that to this end it is desirable that the volume of water used should not be less than five times greater than that of the acid employed to make the solution.

When a precipitate considered sufficiently free from acid has been obtained in the above-described manner, it is dried, either by exposure to the atmosphere or by artificial means, care being taken in the latter case to employ a temperature not exceeding 180° Fahrenheit, so as to avoid decomposition of the precipitate. If allowed to dry undisturbed, the precipitate will take the form of a solid cake or mass, which is, however, quite friable and easily broken into small fragments. The product which I thus obtain differs very materially, both in appearance and in properties, from the lac before treatment; and the change I attribute principally to the abstraction from the lac of a portion of its hydrogen.

My product is infusible, readily soluble in clear water, and quite adhesive when so dissolved in suitable proportions. It will not burn with a bright flame, as do lacs and other resins.

I do not in this application claim the process above described, the same having been described and claimed by me in an application for Letters Patent filed May 5, 1884, Serial No. 130,433.

I claim as my invention and desire to secure by Letters Patent—

The within-described new product, to wit: lac partially dehydrated, so as to become infusible and readily soluble in clear water, substantially as described.

In testimony whereof I have signed my name to this specification in the presence of two subscribing witnesses.

GEORGE S. WOLFF.

Witnesses:
HENRY BOSSERT,
HARRY SMITH.